July 25, 1967 — P. J. MAZZIOTTI — 3,332,256
UNIVERSAL JOINT
Filed Oct. 22, 1965 — 2 Sheets-Sheet 1

INVENTOR.
PHILIP J. MAZZIOTTI
BY Walter E. Pavlick
Harold D. Hall
ATTORNEYS

July 25, 1967 P. J. MAZZIOTTI 3,332,256
UNIVERSAL JOINT
Filed Oct. 22, 1965 2 Sheets-Sheet 2

INVENTOR.
PHILIP J. MAZZIOTTI
BY Walter E. Pawlick
Harold D. Skeel
ATTORNEYS

United States Patent Office 3,332,256
Patented July 25, 1967

3,332,256
UNIVERSAL JOINT
Philip J. Mazziotti, Toledo, Ohio, assignor to Dana Corporation, Toledo, Ohio, a corporation of Virginia
Filed Oct. 22, 1965, Ser. No. 502,137
28 Claims. (Cl. 64—21)

This invention relates to universal joints in general and more particularly to a universal joint of the type which provides a substantially constant velocity transfer of rotary motion.

Many types and designs of substantially constant velocity universal joints are well known in the prior art. However, the majority of such prior art designs are not satisfactory from a cost, production and/or serviceability standpoint and many contain rather complex means for providing constant velocity.

It is, therefore, an object of this invention to provide a universal joint which will transfer rotary motion at a substantially constant velocity.

It is another object of this invention to provide such a universal joint which is relatively easy to manufacture and has a minimum of parts.

Another object of this invention is to provide such a universal joint which is extremely rugged and durable and relies on the inherent geometry and cooperation of the various parts thereof to achieve a substantially constant velocity transfer of rotary motion.

Still another object of this invention is to provide a universal joint which will transmit rotary motion between a pair of members at a substantially constant velocity, which will accommodate angular displacement of the members and will also accommodate relative axial displacement of the members by relative movement of components of the universal joint or, if desired, can be provided so that no axial displacement is possible.

Further and other objects of this invention will become apparent from a consideration of the specification when taken in view of the drawings wherein.

In the preferred embodiments of this invention, a pair of rotatable members are drivingly connected by a plurality of torque transmitting means and each of the torque transmitting means has a first portion thereof positioningly connected to one of the members and a second portion thereof positioningly connected to the other of the members so that when the members assume an angular relationship, such that their axes of rotation intersect each other, the effective centers of the torque transferring means will be disposed in a substantially uniplanar relationship bisecting the angle defined by the intersection of the rotational axes of the members.

Figure 1:
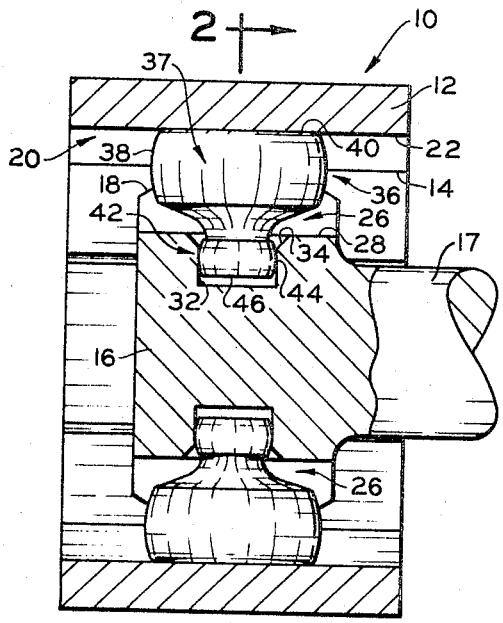
FIG. 1 is a longitudinal sectional view of an embodiment of this invention when the same is viewed along the lines 1—1 in FIG. 2.
Figure 3:
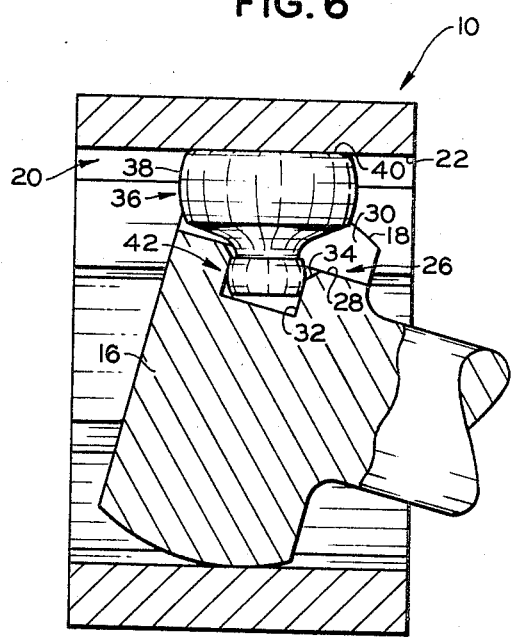
FIG. 3 is a longitudinal sectional view of the embodiment of FIG. 1 when viewed along the lines 3—3 in FIG. 2 and with the components disposed in an angularly displaced relationship.
Figure 2:
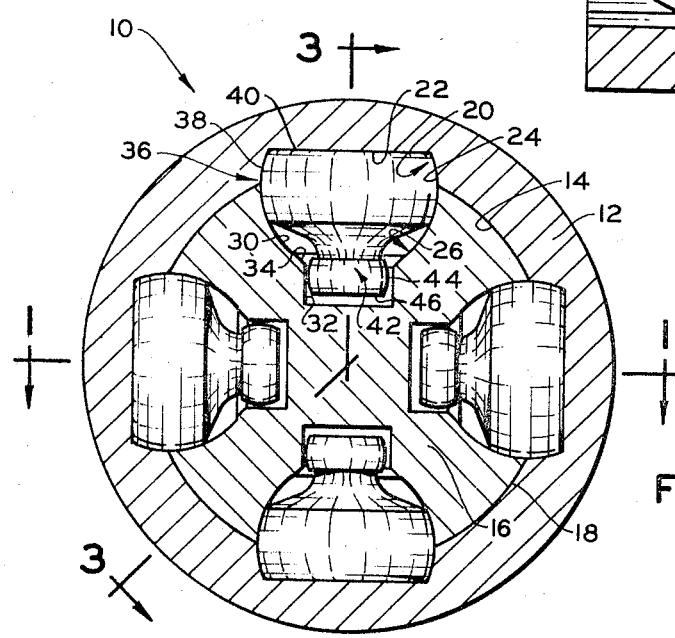
FIG. 2 is a cross-sectional view of the embodiment of FIG. 1 when viewed along the lines 2—2 in FIG. 1.

Referring now to the drawings, and more particularly to FIGS. 1–3, a universal joint 10 includes a pair of cooperatively disposed torque transferring members in the form of a first or outer member 12 which is an axially elongated cylinder having a central axial bore 14, and a second or inner member 16 having a generally spherical surface 18; which inner member is disposed within the central bore 14 of the outer member 12 with the spherical surface 18 thereof in a sliding engagement with the bore 14. The inner member 16 is provided with a shaft extension 17 for conventional attachment in a drive train, while the outer member 12 may be suitably secured in a drive train.

The outer member 12 is provided with a plurality, shown as four in number, of axially extending receiving means in the form of grooves 20 which grooves are disposed within the bore 14 and are circumferentially equally spaced thereabout; it being understood that other numbers of receiving means can be utilized. The radially outer portion or bottom 22 of each of the grooves 20 is flat and disposed parallel to the axis of rotation of the member 12, while the side walls 24 are formed arcuately; both side walls having a common center and the line representing the axially extending locus of such centers is parallel to the axis of rotation of the member 12 and disposed at a radial distance from the axis of the outer member which is slightly less than the radius of the bore 14; that is, it lies on the chord of the groove opening.

The spherical surface 18 of the inner member 16 is axially truncated and is interrupted at circumferentially equal spaced intervals by axially extending receiving means in the form of grooves 26. When the members 12 and 16 are coaxial, each of the grooves 26 is in a paired aligned and radially spaced relationship with one of the grooves 20. The radially inner portion or bottom 28 of each of the grooves 26 is flat and extends parallel to the axis of rotation of the inner member 16, and, when the members 12 and 16 are coaxial, the bottoms 28 and 22 of paired grooves are radially spaced and parallel. The side walls 30 of the grooves 26 are arcuate and are concentric with the walls 24 of the grooves 20 in the outer member 12 and of an equal generating radius with respect thereto. However, it should be noticed that the grooves 26 extend a greater distance radially inwardly than the distance which the grooves 20 extend radially outwardly. Medially disposed in the bottom of each of the grooves 26 is a radially extending bore 32 whose central axis is aligned with the center of the inner member 16; the radially outer end thereof being chamfered as shown at 34.

Disposed in each pair of registering grooves 20 and 26 is a rollable torque transferring means in the form of a roller 36. The roller 36 has a radially outer portion 37 which is of generally truncated spherical configuration so that it has a peripheral spherical surface 38 and a flat radially outer surface 40; the latter being in a sliding positioning registration with the flat bottom 22 of the groove 20 containing the same. The center of the spherical surface 38 is concentric with the generating center of the arcuate portions of the grooves 20 and 26 containing the same and the radius of the spherical portion is slightly less than the generating radius of the arcuate side walls so that, when the rollers 36 are positioned in the grooves 20 and 26, a closely spaced relationship is experienced which is not an interference fit.

The radially inner portion of the roller 36 is in the form of a pilot means 42 extending radially inwardly and integral with the outer portion of the roller 36, and into the bore 32 in the bottom of the groove 26 containing the roller. The inner portion 42 rapidly decreases in dimension with respect to the spherical surface 38 of the roller 36 and terminates at its inner end in a truncated spherical portion 44 disposed in the bore 32; the radially inner end of the inner portion 42 terminating in a flat surface 46 which is radially spaced from the bottom of the bore 32. The bore 32 is not circular in cross-section but is elongated in a circumferential direction with respect to the inner member 16 so that it has a greater circumferential dimension than axial dimension. In the axial direction the bore 32 positioningly registers with and slidingly engages the spherical portion 44 of the pilot means 42, while in the circumferential direction the bore 32 is circumferentially spaced from the pilot means. The circumferential spacing is desirable since, as the outer and inner members 12 and 16 assume an angular relationship during rotation of the joint 10, the spherical portion 38 will oscillate circumferentially relative to the inner member and the circumferential spacing of the bore relative to the spherical portion is desirable to accommodate such oscillation.

As seen in FIG. 3 the arrangement of the various components of the joint 10 allows the outer and inner members 12 and 16 to easily move angularly with respect to each other; the spherical surface 18 slidingly angularly upon the bore 14. During such angular movement, the flat surface 40 of the roller 36 remains in full contact engagement with the bottom 22 of the grooves 20 while the pilot means 42 pivots relative to the inner member 16. Since the groove 26 in the inner member 16 extends radially inwardly an amount greater than the radial extent of the spherical surface 38 of the roller 36, as seen in FIG. 3, substantial angular movement between the inner and outer members will be accommodated before an interfering engagement between the roller and the bottom 28 of the groove 26 occurs. As viewed in FIG. 3, as the inner member is rotated clockwise relative to the outer member, the left end of the groove 26 will radially approach or converge with respect to the groove 20 while the right end of the groove 26 will diverge from the groove 20 and thus a wedging action occurs upon the roller 36 urging the same to the right. Additionally, the bore 32, in moving clockwise in an arcuate manner with the inner member 16, carries the inner portion 42 of the roller 36, and thus the entire roller, axially to the right. Since the inner member 16 is moving arcuately while the roller is moving axially, the inner portion 42 moves slightly outwardly in the bore 32; such outward movement does not interfere with the axial engagement of the bore 32 and portion 42 as a result of the spherical engagement of the spherical portion 44 with the bore. The actual positioning of the roller 36 with respect to the outer and inner members 12 and 16 will be more fully discussed hereinafter. Since the spherical surface 18 of the inner member 16 engages the cylindrical bore 14 of the outer member 12, relative axial movement between the outer and inner members can take place; the rollers 36 moving, within the grooves 20, axially unitarily with the inner member 16 relative to the outer member 12.

Figure 4:
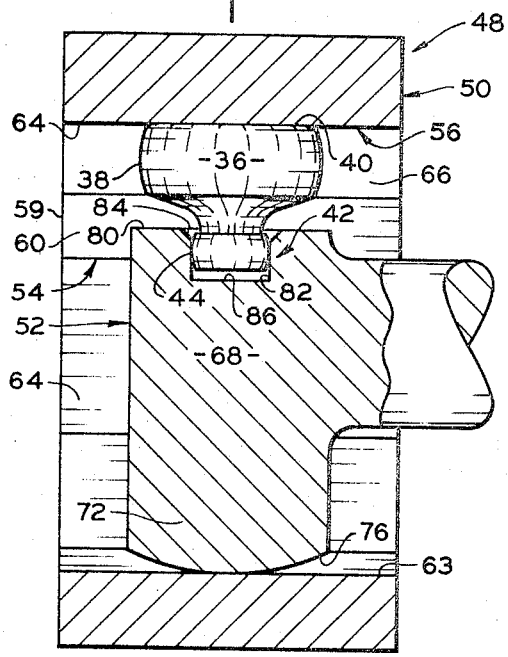
FIG. 4 is a longitudinal sectional view of another embodiment of this invention when viewed along the lines 4—4 in FIG. 5.
Figure 5:
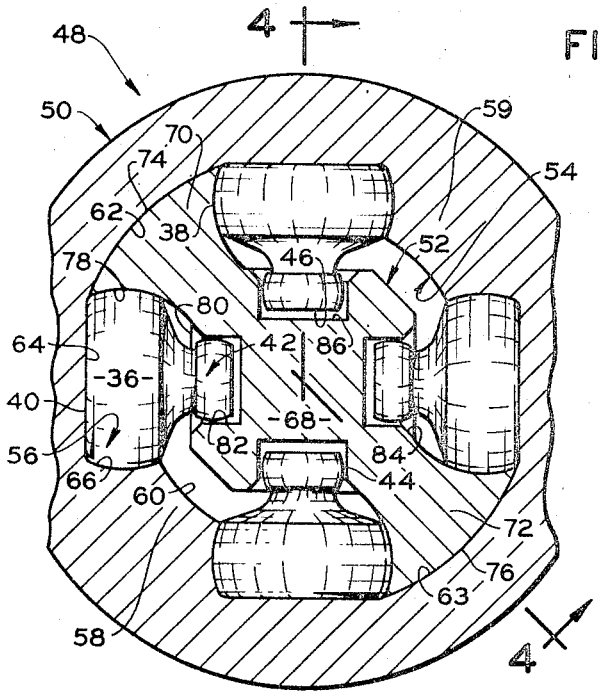
FIG. 5 is a cross-sectional view of the embodiment shown in FIG. 4 when viewed along the lines 5—5 in FIG. 4.

Referring now to FIGS. 4 and 5 wherein another embodiment of this invention is shown, a universal joint indicated generally at 48 includes a first and a second torque transferring member in the form of outer and inner members 50 and 52. The outer member 50 is provided with an axially extending bore shown generally at 54, which bore has an irregular shape when viewed in cross-section so as to define a plurality of receiving means, one of which is indicated generally by the numeral 56. More particularly, the member 50 has a pair of axially straight and elongated and diametrically opposed minor diameter portions or lugs 58 and 59, the internal surfaces 60 thereof being arcuate in form when the member 50 is viewed in cross-section as seen in FIG. 5. Additionally, as seen in FIG. 5, disposed at 90° with respect to the lugs 58 and 59 and circumferentially intermediate the same are the major diameter portions of the bore 54, which major diameter portions are defined by axially straight and elongated and diametrically opposed arcuate internal surfaces 62 and 63. The arc radii of the surfaces 62 and 63 are preferably equal in size and lie on the axis of rotation of the outer member 50.

Circumferentially intermediate each of the internal surfaces 62 and 63 and the adjoining lugs 58 and 59 is an axially elongated flat planar surface 64 which is disposed parallel to the axis of rotation of the outer member 50 and forms the radially outer portion or bottom of each of the receiving means 56. Each of the receiving means 56 is bounded by a flat surface 64 and one of the lugs 58 or 59 so that there are four such receiving means shown in the member 12; it being understood that others numbers of receiving means can be utilized. Cooperatively disposed with each of the receiving means 56 is a torque transmitting means in the form of a roller 36, constructed as described with respect to the roller 36 shown in FIGS. 1–3, with the flat outer surface 40 thereof in registering engagement with the flat planar surface 64 of the receiving means. The lugs 58 and 59 extend radially inwardly from the flat panar surfaces 64 such that the arcuate surface 60 thereof adjoining the roller 36 adjacent thereto are radially coterminous with the spherical surface 38 of the roller. The radially extending walls 66 of each of the portions 58 and 59 extend axially straight and are arcuate in cross-section; such arcuate shape conforming to the arcuate shape of the cross-sectional configuration of the spherical surface 38 of the roller 36, and the line representing the locus of centers from which the walls 66 are generated passes through the generating center of the spherical surface of the roller engaging the wall.

The inner member 52 includes a central body portion 68 having radially extending therefrom a pair of diametrically opposed drive lugs 70 and 72; the external surfaces 74 and 76 of the lugs 70 and 82, respectively, being formed as portions of a sphere, the generating center of which is centralized on the axis of rotation of the inner member 52. The spherical surfaces 74 and 76 are in an angular and axial sliding engagement with the arcuate surfaces 62 and 63 respectively of the major diameter portions of the bore 54; the circumferential extent of the surfaces 74 and 76 at the axial midpoint thereof being coterminous with the circumferential extent of the arcuate surfaces 62 and 63. Each of the lugs 70 and 72 are interposed between a pair of rollers 36, and the circumferentially opposed surfaces thereof are formed as axially straight engaging surfaces 78; which surfaces comprise receiving means and are arcuate when viewed in cross-section and conform to the arcuate cross-sectional configuration of the spherical portion 38 of the rollers 36; the line representing the locus of centers from which an engaging surface 78 is generated passes through the generating center of the spherical surface 38 engaged by such engaging surface. When the members 50 and 52 are disposed coaxially, each of the arcuate engaging surfaces 78 extends radially inwardly of the spherical surface 38 of the engaged roller 36 and join with an axially straight flat planar surface 80 formed on the body portion 68 of the inner member 52; there being four such planar surfaces 80 disposed at 90° with respect to each other and each being parallel to the axis of rotation of the inner member 52 and parallel to one of the first planar surfaces 64 in the outer member; however, the exact shape of the surface 80 in the embodiment of FIGS. 4 and 5, and of the surface 28 in the embodiment of FIGS. 1–3 can be varied as long as the same does not interferingly engage the roller 36.

Axially intermediate the ends of each of the flat planar surfaces 80, a radially extending bore 82 is formed, the central axis of which passes through the center of the body portion 68. The radially outer ends of the bores 82 are chamfered as shown at 84 and the bores receive the radially inner portion 42 of a roller 36. As seen in FIG. 5, the bore 82 is circumferentially elongated such that it is circumferentially spaced from the spherical portion 44 of the inner portion 42 of the roller 38, while, as seen in FIG. 4, in the axial direction the bore 82 is in sliding registering engagement with the spherical surface 44. The radially inner end 86 of the bore 82 is spaced radially inwardly from the radially inner surface 46 of the roller 36.

In the embodiment of FIGS. 4 and 5, two of the rollers 36 are operative to transmit torque between the outer and inner members 50 and 52 in each direction of rotation, while in the embodiment of FIGS 1–3 all of the rollers 36 transmit torque between the outer and inner members 12 and 16 in either direction of rotation. More particularly, and with reference to FIG. 5, if the outer member 50 is considered as being maintained stationary and the inner member 52 transmits clockwise torque thereto, such torque will be transmitted by the diametrically opposed rollers 36 disposed between the lug 70 and the lug 59 and between the lug 72 and the lug 58; while if the inner member is transmitting counterclockwise torque, such will be transmitted by the diametrically opposed rollers 36 between the lug 70 and the lug 58 and between the lug 72 and the lug 59.

Since the lugs 70 and 72 of the inner member 52 are formed with spherical external surfaces 74 and 76 which are in engagement with the cylindrical surfaces 62 and 63 of the outer member 50, the inner and outer members may move both angularly and axially with respect to each other; the engagement of the surfaces 74 and 76 with the surfaces 62 and 63 maintains the center of the inner member on the axis of rotation of the outer member. During such movement, the flat outer surfaces 40 of the rollers 36 are maintained in registering sliding engagement with the flat surfaces 64 of the receiving means 56 by the cooperative action thereon of the receiving means in the inner and outer members. Upon relative angular movement of the inner and outer members, relative pivotal movement takes place between the inner portion 42 of the rollers 36 and the inner member 52; the roller 36 moving axially with respect to the members. Thus, since the inner member 52 is moving arcuately while the roller 36 is moving axially, the inner portion 42 of the roller moves slightly outwardly in the bore 82. Upon relative axial movement of the outer and inner members 50 and 52, the rollers 36 move axially unitarily with the inner member relative to the outer member.

Figure 6:
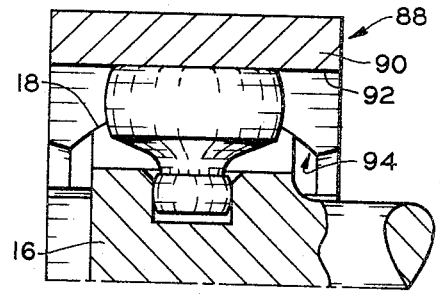
FIG. 6 is a fragmentary longitudinal sectional view of another embodiment of this invention.

Referring to FIG. 6, a modification of the embodiment of FIG. 1 is shown. The universal joint 88 of this embodiment has an inner member 16 identical to the inner member 16 of the universal joint 10 of FIG. 1, and the outer member 90 of the universal joint 88 has grooves 92 formed therein in the same manner as the grooves 20 of the universal joint 10. However, unlike the universal joint 10, the central bore 94 of the outer member 90 is spherical and is concentric with and in a closely fitting sliding engagement with the spherical surface 80 of the inner member 16. Thus, while the inner and outer members 16 and 90 are angularly movable with respect to each other, the engagement of the spherical surface 18 with the spherical bore 94 prevents relative axial movement of the inner and outer members. The arcuate internal surfaces 62 and 63 of the universal joint 48 shown in FIGS. 4 and 5 can, in a similar manner, be formed spherically and concentric with the spherical surfaces 74 and 76 and result in a universal joint which will accommodate angular movement of the inner and outer members 50 and 52 but which is fixed against relative axial movement thereof.

Figure 7:
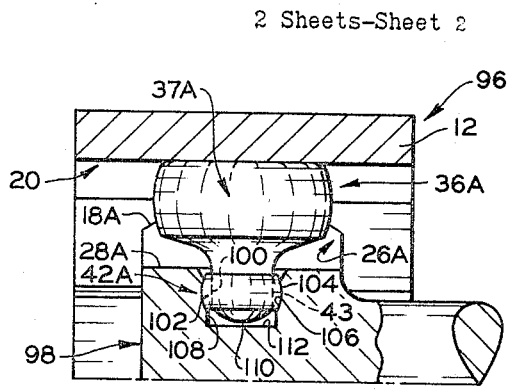
FIG. 7 is a fragmentary longitudinal sectional view of yet another embodiment of this invention.

Referring to FIG. 7, another embodiment of this invention is shown wherein a universal joint 96 has an outer member 12 identical to the outer member 12 of the universal joint 10 of FIGS. 1–3 and an inner member 98; the external periphery 18A and the groves 26A of the inner member being identical to the periphery 18 and grooves 26 of the inner member 16 of the universal joint 10. A torque transferring means in the form of a roller 36A is provided to transmit torque between the outer and inner members 12 and 98, which roller is a slight modification of the roller 36 of the universal joint 10. More particularly, the outer portion 37A of the rollers 36A is identical to the outer portion 37 of the roller 36 and cooperates with the grooves 20 in the outer member 12 and the grooves 26A in the inner member 98 in the same manner as the rollers 36 cooperates with the members 12 and 16 of the universal joint 10.

The inner portion 42A of the roller 36A rapidly decreases in dimension with respect to the outer portion 37A and terminates in a cylindrical portion 43 which is slidingly received in a bore 100 extending radially through a pivot element 102. The pivot element has a spherical external surface 104 pivotally received in a spherical counterbore 106 formed in a bore 108 in the inner member 98. The bore 108 extends radially with respect to the inner member 98 and is positioned axially intermediate the ends of the bottom 28A of the groove 26A, and the central axis of the bore 108 passes through the center of the inner member 98.

Upon angular movement of the inner member 98 relative to the outer member 12, the pivot element 102 moves arcuately unitarily with the inner member 98 while the pivot element 102 pivots unitarily with the inner end 42A of the roller 36A relative to the inner member 98 and any radial displacement between the inner end 42A and the bore 108 is accommodated by relative sliding movement between the pivot element 102 and the inner portion 42A. The radially inner end 110 of the inner portion 42A is formed spherically and is spaced from the bottom 112 of the bore 108; the spherical shape allowing clearance upon relative pivotal movement of the portion 42A and the bore 108. The opening 100 in the pivot element 102 axially slidingly engages the cylindrical portion 43 of the inner end 42A; however, the opening 100, in a circumferential direction with respect to the member 98, is elongated so that it is circumferentially spaced from the cylindrical portion.

In the embodiments of FIGS. 1–7, it is understood that groove configurations other than the parallel grooves shown can be utilized such as certain mirror image groove forms. Additionally, the bottom of the grooves in the outer member can be formed other than flat, the surface of the roller being properly formed to cooperate therewith, and the desired positioning of the roller obtained thereby, i.e., such as cylindrical groove bottoms and spherical surfaces on the roller to cooperate therewith. With the mirror image non-parallel grooves, such will aid in positioning the rollers in a well known manner.

Figure 8:
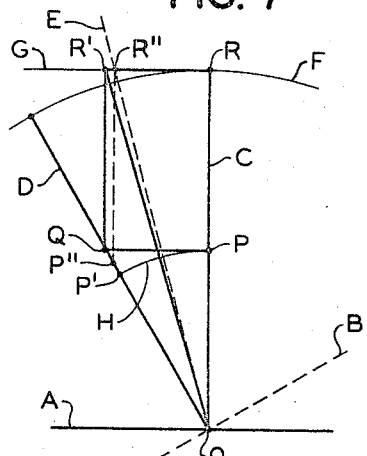
FIG. 8 is a diagrammatic view of the embodiments of the invention of FIGS. 1–6 showing the relationship of the components of the same when in an aligned and when in an angular attitude.

Referring to FIG. 8, a diagrammatic view of the embodiments of FIGS. 1–6 showing the relationship of the components thereof when the inner and outer members are disposed in an aligned and in an angular relationship with respect to each other. For simplicity purposes, this diagram will be explained with reference to the embodiment of FIGS. 1–3; however, such diagram is also applicable to the embodiment of FIGS. 4–6.

The point O represents the center of the universal joint 10 while the line A represents the axis of rotation of the outer member 12; it being understood that, when the outer and inner members 12 and 16 are coaxially aligned, the line A also represents the axis of rotation of the inner member. The line B represents the axis of the inner member 16 and shows the same disposed at approximately a 30° angle with respect to the axis A of the outer member 12. The line C represents the vertical axis of the inner member 16 when the same is disposed coaxial with the outer member 12 and is perpendicular to the line A and passes through the point O. The line D represents the vertical axis of the inner member 16 when it has moved to the 30° angular relationship with respect to the outer member 12, such line being perpendicular to the line B and passing through the center O. The dotted line E has been drawn to bisect the angle defined by the intersection of lines C and D and thus, in accordance with well known geometric principals, bisects the angle defined by the intersection of the lines A and B so that it represents the bisecting plane in which it is desired to maintain the centers of all the torque transmitting means 36 connecting the outer and inner members 12 and 16 in order to achieve a true constant velocity transfer of rotary motion between these members.

The arcuate line F represents the path taken by the periphery of the inner member 16 and the line G represents the central axis of a groove 20 in the outer member.

The point P represents a point on the vertical axis C of the inner member 16 at which lies the center of the spherical portion 44 of the roller 36 when the members 12 and 16 are coaxial, while the arcuate line H represents the path taken by the point P as it moves to its position indicated at P' when the vertical axis of the inner member moves to the position indicated by the line D.

As previously described, during relative angular movement of the members 12 and 16, the outer surface 40 of the roller 36 remains in engagement with the cooperatingly spaced bottom 64 of the groove 56 so that the roller 36 moves axially with respect to the outer member. Thus, the center of the spherical portion 44 moves in an axially straight line to the position indicated by the point Q. Thus, when the axis of the inner member reaches the position indicated by the line D, the center of the spherical portion 44 has moved from an original distance from the center of the inner member indicated by the line segment OP to a distance from such center indicated by the line OQ; such distance being greater than the line segment OP by an amount equal to the line segment P'Q.

The point R indicates the center of the outer portion 37 of the roller 36 when the axis of the outer and inner members 12 and 16 are aligned; such point lying at the intersection of the lines CF and G. Since the roller 36 moves axially relative to the outer member 12 and the portion 37 of the roller 36 must move unitarily with the spherical portion 44 thereof, when the inner and outer members assume the angular relationship shown in FIG. 8, the center of the roller moves to a position indicated at R' which is in vertical alignment with the point Q representing the center of the spherical surface 44. The point R'', indicated at the intersection of the line G and the line E, represents the desired location of the center of the outer portion 37 of the roller 36 so that such center would be in the bisecting plane.

In the diagram of FIG. 8, which is twice size with respect to the universal joint 10 shown in FIGS. 1–3, the distance OP and PR were illustrated as being equal. Since the distance QR' remains equal to the distance PR and the distance OP' remains equal to the distance OP, it is readily apparent that the distance OQ is greater than the distance QR'. Thus, the angle QOR' is smaller than the angle QR'O and, by well known geometric principles, angle QOR' is also smaller than the angle ROR', so that the center of the roller 36, indicated at R', is removed from the bisecting plane by an angular amount indicated by the angle R'OR''. The point P'' represents the desired location for the center of the spherical portion 44, and, at this location, the distance P''R'' is equal to the distance P''O and the angle P''R''O is equal to the angle P''OR''; however, since in the embodiment of FIGS. 1–3, the distance between the centers of the outer portion 37 and the spherical portion 44 are fixed, the distance P''R'', shown in FIG. 8 cannot be attained.

Considering that the diagram of FIG. 8 shows the universal joint 10 with the axis B disposed at a 30° angle with respect to the axis A, the actual deviation from the bisecting plane, that is, the angle R'OR'', is quite small when compared to the well known angular deviation in a cardon type universal joint disposed at a 30° angle. However, it should be noted that the maximum instantaneous deviation from the desired bisecting angle can be reduced by originally providing that the distance PR is greater than the distance PO. Thus, for example, the distance PR could be provided sufficiently larger than the distance PO so that at an angular displacement of the members of 15° (half the expected total angular displacement of 30°), the distance from the center O to the center of the spherical portion 44 (this is the distance PO which increases) would then be equal to the distance PR. With this arrangement, at angular displacements of less than 15° the center of the roller 36 would be disposed at a lesser angle than the angle of the bisecting plane, while at angles above 15° the center would be disposed at a greater angle than the angle of the bisecting plane; however, while the total angular deviation would be equal to the angle R'RO'', the maximum instantaneous angular deviation from the angle of the bisecting plane would be equal to one half the angle R'OR''.

Figure 9:
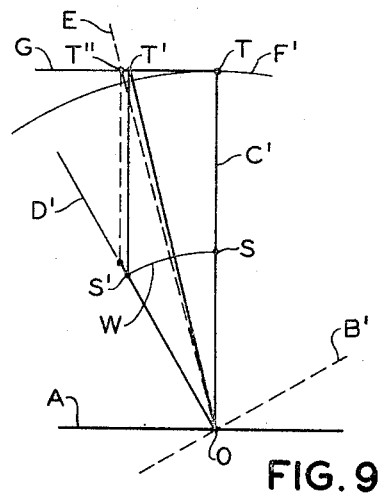
FIG. 9 is a diagrammatic view of the embodiment of the invention shown in FIG. 7 showing the relationship of the components thereof when in an aligned and when in an angular attitude.

Referring now to FIG. 9, which is a diagrammatic representation of the universal joint 96 shown in FIG. 7, since the outer member 12 is the same as that in FIGS. 1–3, the lines G and A and the point O represent the same portions as they did in FIG. 8. The line C' represents the vertical axis of the inner member 98 when the members are coaxially aligned, the lines B' and D' respectively represent the axis of rotation and the vertical axis of the inner member 98 when the same is disposed angularly with respect to the outer member 12, and the arcuate line F' indicates the arcuate path of the periphery of the inner member 98. When the members 12 and 98 are coaxial, the point S on the line C' represents the position on the line C' occupied by the center of the pivot element 102 and the point T represents the center of the outer portion 37A of the roller 36A. The line E represents the desired bisecting angle to be assumed by the roller when the vertical axis of the inner member has reached the position shown by the line D'. As in the diagram shown in FIG. 8, the distances OS and ST have been shown in the diagram of FIG. 9 as being equal.

As the members move angularly to the position shown, the pivot element 102 moves arcuate unitarily with the inner member 98 along the path indicated by the line W and the center thereof assumes the position indicated at S'. Thus, the distance OS', which is the distance from the center of the universal joint 96 to the center of the pilot element 102, remains equal to the distance OS. The distance from the center of the outer portion 37A of the roller 36A to the center of the pivot element 102, when the members are aligned, is shown at TS, and, when the members have moved angularly so that the center of the outer portion 37A has moved to the position T', the distance from T' to the center of the pivot portion 102, indicated by the line T'S', is now greater than the distance TS. Accordingly, the angle S'OT' is greater in size than the angle S'T'O, such that the center T' of the outer portion 37A is removed from the desired bisecting position by an angular amount equal to the angle T'OT''; the desired position for the center of the outer portion 37A being indicated at T'' where the line E intersects the line G.

As discussed above with respect to the diagram shown in FIG. 8, the embodiment of FIG. 7 can be modified to reduce the maximum instantaneous angular deviation from the desired bisecting plane by, with reference to FIG. 9, making the distance OS greater than the distance TS an amount such that when approximately half the maximum angular relationship has been assumed by the inner and outer members, the distance T'S' will be equal to the distance S'O.

From the foregoing it is apparent that universal joints have been described which will transfer rotary motion at a substantially constant velocity, which are relatively easy and inexpensive to manufacture and have a minimum number of parts, which relay on the inherent geometry and cooperation of the various parts thereof to achieve substantially constant velocity transfer of rotary motion and which will accommodate not only angular displacement of the members but also can be adapted to accommodate relative axial displacement of the members by relative movement of components of the universal joints.

While several embodiments of this invention have been shown and described, it is readily apparent that changes can be made therein without departing from the scope of this invention as defined by the following claims.

What is claimed is:

1. A universal joint comprising a pair of rotative members disposed in cooperative relationship and each having an axis of rotation, said members being adapted to be coaxially aligned and to be disposed in an angular relationship with their axes of rotation disposed in an intersecting relationship, each of said members having a plurality of circumferentially spaced generally axially extending receiving means therein disposed radially outwardly from the axis of rotation thereof with each receiving means in one of said members being disposed in a cooperative paired relationship with a receiving means in the other of said members, a separate rollable torque transmitting means disposed in each pair of said pairs of receiving means for transmitting torque between said members and coupling the same for substantially unitary rotation, a first and a second plurality of positioning means carried by said members and said torque transmitting means for positioning the latter relative to said members as said members move angularly relative to each other, said first position means including a surface means formed at one radial end of each of said torque transmitting means and engageable with one of said members within the receiving means thereof, and said second positioning means including a pilot means formed integrally with said torque transmitting means and extending radially therefrom into pivotal engagement with the other of said members, said other member axially engaging said pilot means while being spaced therefrom other than at the locations of such axial engagement.

2. A universal joint comprising a pair of rotative members disposed in cooperative relationship and each having an axis of rotation, said members being adapted to be coaxially aligned and to be disposed in an angular relationship with their axes of rotation disposed in an intersecting relationship, a plurality of cooperatively disposed pairs of receiving means with one receiving means of each pair of receiving means being carried by one of said members and the other of each of said pair of said receiving means being carried by the other of said members, said receiving means having an axis extending generally axially with respect to the member carrying the same, a separate rollable torque transmitting means having at least a portion thereof received in each of said pair of receiving means for transmitting torque between said members and coupling the same for substantially unitary rotation, each of said torque transmitting means having an axis of rotation which is disposed radially with respect to the axis of rotation of both of said members when said members are coaxially aligned, and positioning means for positioning said torque transmitting means relative to said members and including, means including said receiving means for maintaining the axis of rotation of said torque transmitting means in a radially extending relationship with the axis of rotation of one of said members when said members are disposed in an angular relationship and pilot means formed integrally with said torque transmitting means and extending out of said receiving means and into pivotal engagement with the other of said members.

3. A universal joint comprising a pair of rotative members disposed in cooperative relationship and each having an axis of rotation, said members being adapted to be coaxially aligned and to be disposed in an angular relationship with their axes of rotation disposed in an intersecting relationship, a plurality of cooperatively disposed pairs of receiving means being carried by one of said members and the other of each of said pair of said receiving means being carried by the other of said members, said receiving means having an axis extending generally axially with respect to the member carrying the same, a separate rollable torque transmitting means having a first portion thereof disposed in each of said pair of receiving means for transmitting torque between said members and coupling the same for substantially unitary rotation, each of said torque transmitting means having an axis of rotation with is disposed radially with respect to the axis of rotation of both of said members when said members are coaxially aligned, means including said receiving means for maintaining the axis of rotation of the first portion of said torque transmitting means constantly in a radially extending relationship with the axis of rotation of one of said members, said torque transmitting means including a second portion in the form of a pilot means formed integrally with said first portion and extending radially out of said receiving means and into pivotal engagement with the other of said members.

4. A universal joint according to claim 3 wherein said pilot means has a radially extending axis which is coaxial with the axis of rotation of the first portion of said torque transmitting means integral therewith, and said torque transmitting means and the receiving means in said one of said members are axially movable with respect to each other.

5. A universal joint comprising a pair of rotative members disposed in cooperative relationship and each having an axis of rotation, said members being adapted to be coaxially aligned and to be disposed in an angular relationship with their axes of rotation disposed in an intersecting relationship, each of said members having a plurality of generally axially extending receiving means therein with each receiving means in one of said members being disposed in a cooperative paired relationship with a receiving means in the other of said members, a bore means formed in each of the receiving means of one of said members and extending radially with respect to said member, and a separate torque transmitting means disposed in each of said pair of receiving means for transmitting torque between said members and coupling the same for substantially unitary rotation, each of said torque transmitting means including a pilot means formed integrally therewith and extending radially therefrom into one of said bore means, said bore means being circumferentially spaced from said pilot means while engaging the axially opposed sides of said pilot means in a sliding relationship.

6. A universal joint according to claim 5 wherein the other of said members includes a positioning means for each of said torque transmitting means, said positioning means engaging said torque transmitting means for positioning the same in cooperation with the positioning of said torque transmitting means by said pilot means and said bore means.

7. A universal joint according to claim 6 wherein each of said receiving means in said other member has a positioning means therein.

8. A universal joint according to claim 5 wherein each of the receiving means in said other member has a bottom which is parallel to the axis of rotation of said other member, said bore means are formed in the receiving means of said one member, said torque transmitting means has an axially extending surface on the position thereof which is radially opposed to the pilot means thereof and said surface is in a registering sliding engagement with the bottom of the receiving means in which the same is disposed for maintaining said pilot means in a constant radially extending relationship with respect to the axis of rotation of said other member.

9. A universal joint according to claim 8 wherein said other of said members has an internal bore, said one of said members has a generally spherical surface, portions of which surface are in sliding engagement with the bore of said other member and said bore means have a central axis disposed radially with respect to the axis of rotation of said one member and passes through the generating center of the spherical surface thereof.

10. A universal joint comprising a pair of rotative members disposed in a cooperative relationship and each having an axis of rotation, said members being adapted to be coaxially aligned and to be disposed in an angular relationship with their axes of rotation disposed in an intersecting relationship, a plurality of cooperatively disposed pairs of receiving means with one receiving means of each of said pair of receiving means being carried by one of said members and the other of each of said pair of receiving means being carried by the other of said members, said receiving means being spaced radially outwardly from the axis of rotation of the member carrying the same and having an axis extending generally axially with respect to the member carrying the same, each of said receiving means having a generally radially extending axially elongated wall and a generally axially extending bottom, the walls and the bottoms of each of said pair of receiving means being respectively circumferentially and radially spaced, a separate rollable torque transmitting means cooperating with each pair of said receiving means and having a first portion thereof received in said pair of receiving means cooperating therewith for transmitting torque between said members and coupling the same for substantially unitary rotation, said torque transmitting means having an axis of rotation disposed constantly radially with respect to the axis of rotation of one of said members and an axially extending surface registering with and engaging the bottom of the receiving means in said one member receiving the same, the first portion of said torque transmitting means having a peripheral rolling surface rotatable about the axis of rotation thereof and in engagement with the circumferentially spaced walls of the receiving means receiving the same, the bottom of said receiving means in said other member being radially spaced from the first portion of said torque transmitting means received therein, said torque transmitting means including a pilot means formed integrally with the first portion thereof and coaxially rotatable therewith and extending radially from said first portion into pivotal engagement with said other member, said other member axially engaging said pilot means while being circumferentially spaced therefrom for axially positioning said torque transmitting means relative to said one member.

11. A universal joint according to claim 10 wherein said other member is provided with a radially extending bore means in the bottom of each of said receiving means therein with the central axis of said bore passing through the center of said other member, the pilot means of each of said torque transmitting means engaging said other member within the bore means in the bottom of the receiving means receiving said torque transferring means.

12. A universal joint according to claim 11 wherein the surface of each of said pilot means which engages said bore means is generally spherical, the radially extending axially opposed walls of said bore means slidingly engage said spherical surface while the portions of said bore means other than said axially opposed walls are spaced from said spherical surface for allowing said other member to pivot relative to said pilot means and for allowing said pilot means to move outwardly with respect to said bore means and circumferentially relative to said other member during such pivotal movement.

13. A universal joint according to claim 11 wherein the portion of said pilot means which engages said bore means is generally cylindrical, each of said bore means is pivotally carried by said other member, the radially extending axially opposed walls of said bore means slidingly engage the cylindrical surface of said pilot means while the portions of said bore means disposed with respect to said spherical surface in a direction which is circumferential when considered with respect to the axis of said other member are spaced from the cylindrical surface for allowing said other member to pivot relative to said pilot means and for allowing said pilot means to move outwardly and circumferentially with respect to said bore means during such pivotal movement.

14. A universal joint comprising an outer member having an axis of rotation and an axially extending bore therein, an inner member having an axis of rotation and being disposed in the bore of said outer member and angularly movable relative thereto, said members being adapted to be coaxially aligned and to be disposed in an angular relationship with their axes of rotation disposed in an intersecting relationship, said outer member having a plurality of circumferentially spaced and generally axially extending first groove means formed within the bore thereof, a plurality of circumferentially spaced generally axially extending second groove means formed into the periphery of said inner member with each of said second groove means being in a cooperative paired relationship with a groove means in said outer member, a separate rollable torque transmitting means disposed in each pair of said pairs of groove means for transmitting torque between said members and coupling the same for substantially unitary rotation, said torque transmitting means having a peripheral rolling surface rotatable about the axis of rotation thereof which surface is in engagement with the groove means receiving the same, a plurality of positioning means carried by said outer member radially outwardly from the bore therein with each positioning means of said plurality of positioning means cooperating with a different one of said torque transmitting means, and a second plurality of positioning means including a pilot means formed integrally with each of said torque transmitting means and coaxially rotatable therewith and extending radially inwardly from the rolling surface thereof and into pivotal engagement with said inner member, said inner member axially engaging said pilot means for moving said torque transmitting means axially relative to said members as the same move angularly relative to each other.

15. A universal joint according to claim 14 wherein said first positioning means includes surface means formed on a radially outer portion of each of said torque transmitting means and means formed in the radially outer portion of each of said first groove means and engageable with said surface means.

16. A universal joint according to claim 15 wherein said surface means comprises the radially outer end surface of said torque transmitting means and the means cooperating therewith comprises the bottom of said first groove means.

17. A universal joint comprising an outer member having an axis of rotation and an axially extending bore therein, an inner member having an axis of rotation and being disposed in the bore of said outer member, said inner member having a generally spherical periphery in sliding engagement with the bore of said outer member and said members being adapted to be coaxially aligned and to be disposed in an angular relationship with their axes of rotation disposed in an intersecting relationship, said outer member having a plurality of circumferentially spaced and generally axially extending first groove means formed within the bore thereof with each of said groove means having a generally radially extending axially elongated wall and an axially elongated bottom disposed substantially parallel to the axis of rotation thereof, a plurality of circumferentially spaced generally axially extending second groove means formed into the periphery of said inner member with each of said second groove means being disposed in a cooperative paired relationship with a groove means in said outer member, said second groove means each having a generally radially extending axially elongated wall and a generally axially extending bottom, the wall of each of said second groove means being circumferentially spaced with respect to the wall of said first groove means paired therewith and the bottoms of said paired groove means being radially spaced from each other, a separate rollable torque transmitting means disposed in each pair of said pairs of groove means for transmitting torque between said members and coupling the same for substantially unitary rotation, said torque transmitting means having an axis of rotation disposed radially with respect to the axis of rotation of said outer member and a radially outer surface formed parallel with and in registering engagement with the bottom of said first groove means receiving the same, said torque transmitting means having a peripheral rolling surface rotatable about the axis of rotation thereof which surface is in engagement with the circumferentially spaced walls of the groove means receiving the same, when said members are coaxially aligned the walls of said second groove means extend radially inwardly of said peripheral engaging surface of the torque transmitting means received therein and the bottom of said second groove means is spaced radially inwardly of said engaging surface, and pilot means formed integrally with said torque transmitting means and coaxially rotatable therewith and extending radially inwardly from said rolling surface and into pivotal engagement with said inner member, said inner member axially engaging said pilot means for urging said torque transmitting means axially relative to said outer member as said inner and outer members move angularly relative to each other.

18. A universal joint according to claim 17 wherein the bore in said outer member is cylindrical in form and extends axially relative thereto, said torque transmitting means are axially movable relative to said outer member whereby said inner and outer members are axially movable relative to each other in addition to being angularly movable and said torque transmitting means move unitarily with said inner member relative to said outer member during relative axial movement of said members.

19. A universal joint according to claim 17 wherein portions of the bore of said outer member are of general spherical configuration, and the spherical surface of said inner member spherically and slidingly engages the spherical portions of said bore.

20. A universal joint comprising, a pair of rotative members disposed in cooperative relationship and each having an axis of rotation, said members being adapted to be coaxially aligned and to be disposed in an angular relationship, each of said members having a plurality of circumferentially spaced generally axially extending receiving means therein disposed radially outwardly from the axis of rotation thereof with each receiving means in one of said members being disposed in a cooperatively paired relationship with a receiving means in the other of said members, a separate rollable torque transmitting element disposed in each pair of said pairs of receiving means for transmitting torque between said members thereby coupling the same for substantially unitary rotation, each of said torque transmitting elements having an axis of rotation, a first and a second plurality of positioning means carried by said members and said torque transmitting elements for positioning the latter relative to said members as said members move angularly relative to each other, said first positioning means including a first surface means formed at one radial end of each of said torque transmitting means and a second surface means formed on one of said members within the receiving means thereof and engaged by said first surface means, said second positioning means including a pilot element pivotally engaging the other of said members at a position within the receiving means thereof, and connecting means connecting said pilot element to said torque transmitting element and maintaining the centers of said elements on the axis of rotation of said torque transmitting elements as said members move angularly relative to each other.

21. A universal joint according to claim 20 wherein said connecting means is formed integral with one of said elements, said other element has a bore therein, and said connecting means is telescopically received in said bore for sliding movement therein.

22. A universal joint according to claim 21 wherein said one element is said torque transmitting element and said other element having a bore therein is said pilot element.

23. A universal joint comprising a pair of rotative members disposed in cooperative relationship and each having an axis of rotation, a plurality of cooperatively disposed pairs of receiving means with one receiving means of each pair of receiving means being carried by one of said members and the other of each of said pair of receiving means being carried by the other of said members, said receiving means having an axis extending generally axially with respect to the member carrying the same, a separate rollable torque transmitting element having at least a portion thereof received in each of said pair of receiving means for transmitting torque between said members and coupling the same for substantially unitary rotation, each of said torque transmitting elements having an axis of rotation which is disposed radially with respect to the axis of rotation of both of said members when said members are coaxially aligned, and positioning means for positioning said torque transmitting elements relative to said members and comprising, means including said receiving means for maintaining the axis of rotation of said torque transmitting elements in a radially extending relationship with one of said members regardless of the angular relationship of said members, a pilot element for each of said torque transmitting elements, and connecting means connecting a pilot element to each of said torque transmitting elements and maintaining the center of said pilot element on the rotational axis of said torque transmitting element to which it is connected, said pilot element being axially engaged by said other member and pivotable relative thereto for urging said torque transmitting elements axially relative to said one member as said members move angularly relative to each other.

24. A universal joint according to claim 23 wherein said pilot element engages said other member within the receiving means therein, said connecting means extends radially with respect to the axis of rotation of said one member, at least one of said elements has a bore therein, and said connecting means is telescopically received in the bore of said one of said elements for sliding movement relative thereto.

25. A universal joint comprising an outer member having an axis of rotation and an axially extending bore therein, an inner member having an axis of rotation and being disposed in the bore of said outer member, said inner member having a peripheral surface in a sliding engagement with the bore of said outer member for angular movement relative thereto, said outer member having a plurality of circumferentially spaced and generally axially extending first groove means formed within the bore thereof with each of said groove means having at least one circumferentially facing side wall and a bottom extending generally axially with respect to said member, a plurality of circumferentially spaced generally axially extending second groove means formed into the periphery of said inner member with each of said second groove means being disposed in a cooperative paired relationship with a groove means in said outer member, said second groove means each having at least one circumferentially facing side wall and a bottom, at least the medial portion of the wall of each of said second groove means being circumferentially spaced with respect to the wall of said first groove means paired therewith when said members are aligned and the bottoms of said paired groove means being radially spaced from each other, a separate rollable torque transmitting element disposed in each pair of said pairs of groove means for transmitting torque between said members while coupling the same for substantially unitary rotation, said torque transmitting element having an axis of rotation disposed radially with respect to the axis of rotation of said outer member when said members are aligned and a radially outer surface formed parallel with and in registering engagement with the bottom of said first groove means receiving the same, said torque transmitting elements having a peripheral rolling surface rotatable about the axis of rotation thereof which surface is in engagement with the circumferentially spaced walls of the groove means receiving the same, a pilot element for each of said torque transmitting elements, connecting means connecting one of said pilot elements to each of said torque transmitting elements and maintaining the centers of said connected elements on a common axis and maintaining said common axis coaxial with the axis of rotation of said torque transmitting element, said pilot elements being spaced radially inwardly from the rolling surface of said torque transmitting elements and in pivotal engagement with said inner member, said inner member at least axially engaging said pilot elements for urging said pilot means and said torque transmitting elements axially relative to said outer member as said members move angularly relative to each other.

26. A universal joint according to claim 25 wherein said connecting means is formed integral with one of said elements, said other element has a bore therein, and said connecting means is telescopically received in said bore for sliding movement therein.

27. A universal joint according to claim 26 wherein said one element is said torque transmitting element and said other element having a bore therein is said pilot element.

28. A universal joint according to claim 27 wherein the bore in said outer member is cylindrical in form and extends axially relative thereto, the periphery of said inner member engageable with said bore is generally spherical, the axis of said groove means are axially straight, said bottoms of said first groove means are axially straight and parallel to the axis of rotation of the member in which they are formed, said radial outer surface of said torque transmitting elements are substantially flat whereby the rotational axis thereof is disposed constantly radially with respect to the axis of rotation of said outer member, and said torque transmitting elements move axially unitarily with said inner member relative to said outer member during relative axial movement of said members.

References Cited

UNITED STATES PATENTS

| | | | |
|---|---|---|---|
| 2,354,961 | 8/1944 | O'Donnell | 64—8 |
| 2,902,844 | 9/1959 | Rzeppa | 64—21 |
| 2,908,151 | 10/1959 | Wahlmark | 64—21 |
| 3,106,077 | 10/1963 | Sharp | 64—21 |
| 3,187,520 | 6/1965 | Rzeppa | 64—21 |

FRED C. MATTERN, Jr., *Primary Examiner.*

H. C. COE, *Assistant Examiner.*